United States Patent

Mack et al.

[15] 3,643,239

[45] Feb. 15, 1972

[54] METHOD OF REDUCING BIT LINE TO BIT LINE COUPLED NOISE IN A PLATED WIRE MEMORY STACK

[72] Inventors: Thomas W. Mack; David P. Peretto; Alden W. Allen, all of St. Paul, Minn.

[73] Assignee: Sperry Rand Corporation, New York, N.Y.

[22] Filed: Dec. 5, 1969

[21] Appl. No.: 882,578

[52] U.S. Cl. ...........340/174 DC, 340/174 CC, 340/174 DA, 340/174 PW, 340/174 RC, 340/174 TF

[51] Int. Cl...................G11c 5/06, G11c 11/04, G11c 11/14

[58] Field of Search ................340/174 M, 174 CR, 174 PW, 340/174 DC, 174 RC, 174 NC

[56] References Cited

UNITED STATES PATENTS 3,404,387 10/1968 Hiroshi Amemiya..................340/174

*Primary Examiner*—James W. Moffitt

*Attorney*—Thomas J. Nikolai, Kenneth T. Grace and John P. Dority

[57] ABSTRACT

A method of transposing and interposing the bit lines of a plated wire bit line memory stack involving coupling the like-ordered bit lines of different plated wire arrays in alternate transposed and nontransposed configurations and then forming separate groups of the transposed and the nontransposed bit lines, each group, defining an ordered bit of a plurality of multibit words.

7 Claims, 4 Drawing Figures

INVENTORS
THOMAS W. MACK
DAVID P. PERETTO
ALDEN W. ALLEN

BY Kenneth T. Grace
ATTORNEY

METHOD OF REDUCING BIT LINE TO BIT LINE COUPLED NOISE IN A PLATED WIRE MEMORY STACK

BACKGROUND OF THE INVENTION

The present invention relates to the electronic data-processing field and in its preferred embodiment to an electrically alterable memory system for using electrical conductors plated with a thin ferromagnetic film layer as the memory elements. Such memory elements are well known for their principle advantage lying in their adaptability to mass, or batch, fabrication techniques which provide high volumetric efficiency, i.e., many binary digits, or bits, per cubic inch, and, the resulting economy. An excellent background for such memory systems appears in the publication, "A 500 - Nanosecond Main Computer Memory Utilizing Plated-Wire Elements", AFIPS, Conference Proceedings, Volume 29, 1966, FJCC, pages 305–314.

Plated wire memory systems utilizing the magnetization of areas along a conductive wire plated by a thin ferromagnetic film layer may be operated in the well-known word-organized or bit-organized memory systems. The high volumetric efficiency achieved by such memory systems must necessarily bring the several areas of magnetization, each representing discrete bits of digital data, and their associated circuitry into closer proximity whereby there arises "moise" signals similar to those obtained in more conventional toroidal ferrite core arrays. With the plated wire bit lines, which are normally established in a parallel, planar array and enveloped by a plurality of word lines orthogonal thereto, there is provided the normal capacitive and inductive coupling between adjacent bit lines and word lines whereby memory selection currents may induce noise signals in the selected bit lines that are of such a magnitude as to substantially block out the digital significance of the readout signal. An excellent background for such noise signal conditions appears in the publication "Cross-Talk and Reflections in High Speed Digital Systems", AFIPS, Conference Proceedings, Volume 27, Part I, 1965, FJCC, pages 511–525. Accordingly, several prior art techniques for the elimination of such deleterious noise signals have been incorporated in plated wire memory systems.

One prior art technique often utilized to eliminate, or reduce deleterious noise signals is the utilization of a dummy wire or line. In toroidal ferrite core arrays such dummy lines generally consist of a conductor running parallel to and associated with a particular output or sense line such that the dummy line and the output line are affected by substantially the same noise signals whereby there is induced in such lines similar, common mode, noise signals. The dummy line and the output or sense line are coupled to a differential sense amplifier which cancels out the common mode noise signals leaving only the desired readout signal as an output therefrom. In plated wire memory systems the dummy line usually consists of a bit line, similar to that of the other plated wires of the plated wire array, which is coupled in parallel, by suitable gating means, with a plurality of bit lines. The dummy line and the associated plurality of active bit lines are maintained in a substantially closely packed relationship whereby it is expected that common mode noise signals, which are induced in the dummy line, are equal to those that are induced in each of the associated active bit lines whereby the associated differential amplifier provides a signal substantially representative of the expected readout signal.

As the noise or common mode signals are generally due to radiated coupling, denoted as capacitive and inductive coupling, large loop areas established by substantially widely separated dummy line, digit line pairs can contribute undesirably large noise signals of different intensities whereby the differential sense amplifier is unable to eliminate all the deleterious noise. It would be desirable if each bit line has its own associated dummy line whereby the physical relationship therebetween would be constant throughout the entire two-dimensional plated wire memory array. However, it is obvious that this expedient would halve the volumetric efficiency, and, accordingly, double the cost per bit of such memory system. Several systems specifically directed toward the selection of a particular active line, dummy line combination include: the C. A. Nelson U.S. Pat. No. 3,465,312; the copending patent application of J. M. Cline, Ser. No. 701,433, filed Jan. 29, 1968, now U.S. Pat. No. 3,510,856; and, the copending patent application of A. E. Liepa, Ser. No. 701,591, filed Jan. 30, 1968, now U.S. Pat. No. 3,533,083.

In the prior art to which the present invention is directed the memory stack is comprised of two superposed arrays, each array including two superposed planes. Each plane includes 180 parallel, coplanar bit lines and 256 parallel word lines enveloping and orthogonal to the inductively coupled bit lines. The 180 bit lines are divided into 10 groups of 18 contiguous bit lines, each group including 16 magnetizable material plated active lines and two dummy lines, each group defining a separate ordered bit of a 10-bit word along the inductively associated word lines. The selection system selects one active line, dummy line combination of each group out of which is read the readout 10-bit data word as determined by the particular selected word line; see the copending patent application of J. F. Bruder, Ser. No. 647,017, filed June 19, 1967, now U.S. Pat. No. 3,484,765.

The superposed, like-ordered bit lines and the like groups of bit lines of each plane were intercoupled in a nontransposed manner weaving forth and back through the planes of the array much in the same fashion as are the X,Y drive lines of bit-organized toroidal core memory stacks; see the W. S. Humphrey, Jr., et al., U.S. Pat. No. 3,058,096. However, because of the high volumetric efficiency of the plated wire memory stack and because the selection of one word line affects all coupled bit lines in a like manner, whether readout or not, the inductive and capacitive coupling between bit lines, due to bit line generated signals, produces a crosstalk noise that results in a time shift of the selected bit line's output signal and hence marginal memory stack operation. Therefore, it is desirable that there be provided a method whereby this inductively and capacitively coupled crosstalk noise be substantially reduced.

SUMMARY OF THE INVENTION

In the method of the present invention the prior art planes of the memory stack described above are, by the manner of the intercoupling and the grouping of their bit lines caused to effect a substantially reduced level of crosstalk noise, and, accordingly, to provide substantially improved memory stack operating signal timing and amplitude reliability. The method of the present invention involves organizing the 180 bit lines of each of the four planes of the memory stack into 10 groups of 18 contiguous bit lines, each group including 16 active lines and two dummy lines. This is as before. The superposed, alternate, like-ordered, e.g., even-numbered, bit lines of the first and second arrays are intercoupled in a nontransposed manner as before. However, the superposed, other alternate, like-ordered, e.g., odd-numbered bit lines of the first and second arrays are intercoupled in a transposed manner. This arrangement causes alternate numbered bit lines, i.e., the odd-numbered lines are alternate to and interposed between the even-numbered bit lines, because of the nontransposed and transposed intercoupling, to generate subtractive, opposite polarity, bit line output signal generated crosstalk noise signals in mutually adjacent bit lines.

However, because of the alternate nontransposed and transposed intercoupling of the bit lines of the groups of bit lines and because both bit lines of the selected active line, dummy line combination must be both nontransposed or transposed to effect the desired common mode noise cancellation, it is then required that only nontransposed or transposed bit lines be coupled to the same associated ordered bit differential amplifier in the output circuitry. Thus then, the even-ordered and the odd-ordered bit lines (associated with the nontransposed and the transposed bit lines, respectively) of two contiguous bits, e.g., a first group and a second group, of bit lines are grouped together. Thus, the, e.g., even-numbered, bit lines of the first and second group of bit lines are coupled to a first differential amplifier defining a first bit 0 of the 10-bit word while the, e.g., odd-numbered, bit lines of the first and second groups of bit lines are coupled to a second differential amplifier defining a second bit 1 of the 10-bit word. All 10 groups of bit lines are configured in a like manner whereby selection of both lines of any selected active line, dummy line combination ensures that both lines of the selected combination are either of a nontransposed or of a transposed wiring configuration.

DESCRIPTION OF THE PREFERRED EMBODIMENT

Figure 1:
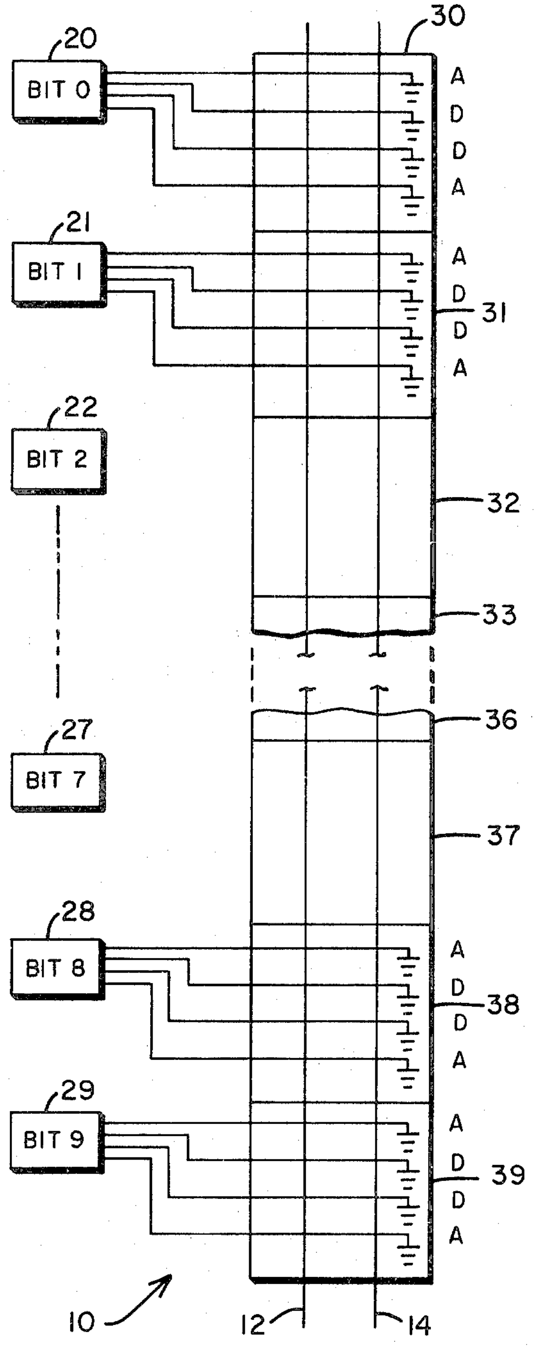
PRIOR ART Fig. 1
FIG. 1 is a schematic illustration of a prior art plated wire memory stack configuration.

With particular reference to FIG. 1 there is presented a schematic illustration of a prior art plated wire memory stack configuration. This plated wire configuration is comprised of two superposed arrays, each array including two superposed planes. Each plane includes 180 parallel, coplanar bit lines parallelly aligned in a top to bottom direction and 256 parallel word lines parallelly aligned in a left to right direction enveloping and orthogonal to the inductively coupled bit lines. The 180 bit lines are divided into 10 groups of 18 contiguous bit lines (only four illustrated) each group including 16 magnetizable material plated active lines (only two illustrated) and two dummy lines (only two illustrated), each group defining a separately ordered bit 0–9 of a 10-bit word organized along the word lines 12, 14. The selection system includes bit line selectors 20–29, each of which selects one active line A, dummy line D combination out of each group 30–39 of bit lines out of which is read the readout 10-bit data word as determined by the particular selected word line 12–14; see the copending patent application of J. F. Bruder, Ser. No. 647,017, filed June 19, 1967, now U.S. Pat. No. 3,484,765.

The active line, dummy line selection system, such as referenced above, is accomplished by a single-ended selection technique to a line switch associated with each of the active lines and the associated dummy line. The line switches of all of the active lines and of the associated dummy line are coupled, in common, to separate associated common buses. The common bus of the particular memory section is, in turn, coupled in parallel to first and second terminals of the associated differential sense amplifier and the bidirectional bit driver. Because of the high volumetric efficiency of the plated wire memory stack and because the selection of one word line 12, 14 affects all coupled bit lines of groups 30–39 of the active line, dummy line combinations in a like manner, whether read out or not by the associated bit selector 20–29, the inductive and capacitive coupling between adjacent, parallel running bit lines, due to bit line generated signals, produces an external-field coupled like-directional signal that is additive therein because such bit lines are intercoupled in a nontransposed manner. The term "transposed" when used in the present application shall mean that the electrical sense of the "transposed" bit line is opposite to the electrical sense of the "nontransposed" bit line.

Figure 2:
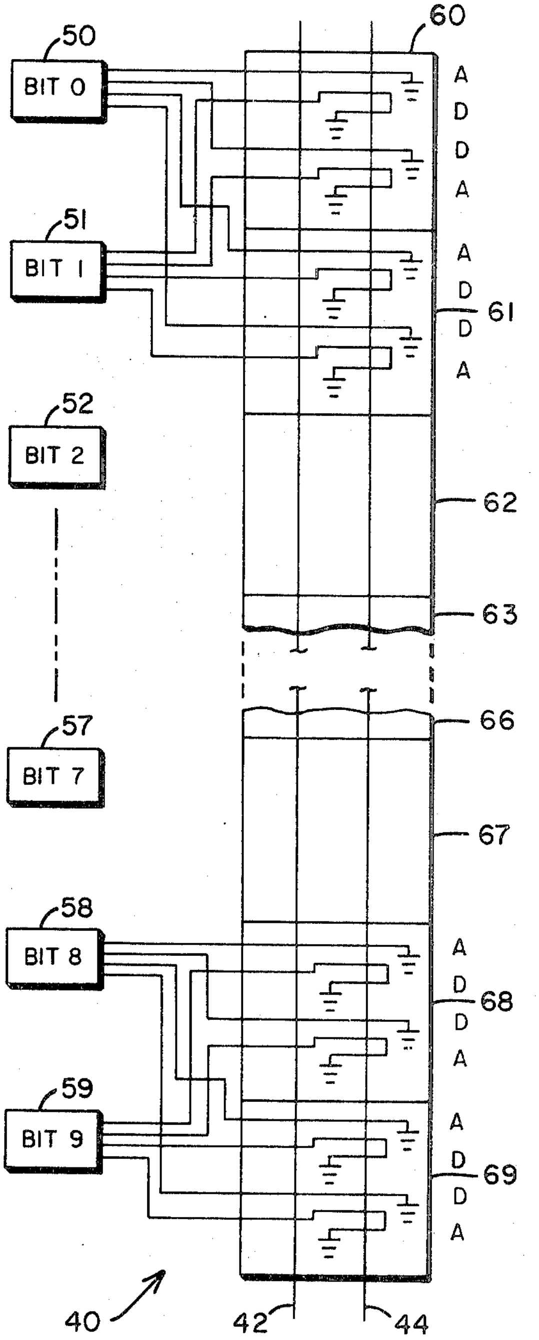
FIG. 2 is a schematic illustration of the plated wire memory stack configuration of the present invention.

With particular reference to FIG. 2 there is presented a schematic illustration of the plated wire memory stack configuration of the present invention. In this novel configuration the physical construction of the two arrays and their included two planes are identical to that of the prior art configuration of FIG. 1; the novel distinction residing in the interarray coupling of the bit lines of the two arrays and the arrangement of alternate bit lines of two contiguous groups of bit lines, e.g., 60, 61, coupled to an associated bit selector, e.g., 50, and the other alternate bit lines of the same two contiguous groups of bit lines, e g., 60, 61, coupled to another associated bit selector, e.g., 51. In contrast to the configuration of FIG. 2, the inductive and capacitive coupling between adjacent, parallel running bit lines, due to bit line generated signals, produces an external field-coupled opposite-directional signal that is subtractive therein because such bit lines are intercoupled in a transposed manner.

Figure 3:
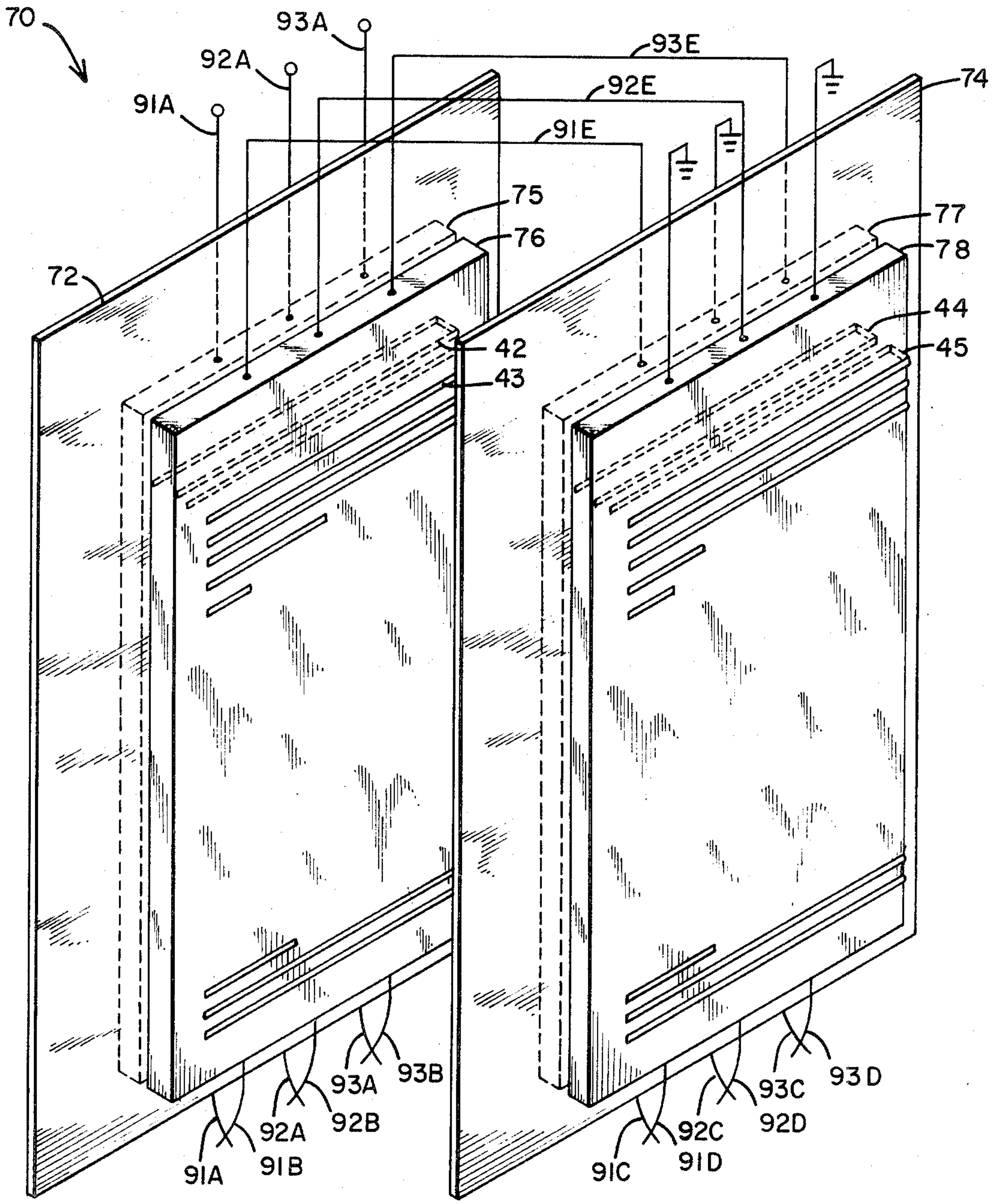
FIG. 3 is a diagrammatic illustration of the two-array, two planes per array plated wire memory stack configuration in which the present invention is incorporated.

With particular reference to FIG. 3 there is presented a diagrammatic illustration of the two-array, two planes per array configuration in which the present invention is incorporated. This illustration of the physical configuration of the memory stack of the present invention, in contrast to the electrical configuration of the present invention as illustrated in FIG. 2, is presented to illustrate the nature of the transposition, nontransposition intercoupling of the bit lines of the two arrays that make up the illustrated memory stack. Memory stack 70 is comprised of a first array 72 including first and second planes 75, 76 and a second array 74 including third and fourth planes 77, 78. All of the planes 75, 76, 77, 78 are substantially identical including 180 parallel, coplanar bit lines, parallelly aligned in a left to right direction, and 256 parallel word lines, parallelly aligned in a top to bottom direction, that envelop and are orthogonal to the inductively associated bit lines. Such plated-wire memory plane structure may be in accordance with the copending patent application of L. J. Michaud, Ser. No. 644,861, filed June 9, 1967, now U.S. Pat. No. 3,538,599. As the word lines 42, 43, 44, 45 and their selection scheme play no part in the present invention no particular detail is presented therefor except to illustrate their physical relationship with the enveloped bit lines.

Each plane includes 180 parallel, coplanar bit lines 91, 92, 93,—that are intercoupled in a nontransposed or transposed manner. For ease of discussion the first array 72 may be described as including:

First plane 75 which includes ordered bit lines 91A, 92A, 93A,—and a second plane 76 which includes ordered bit lines 91B, 92B, 93B,—.

The second array 74 may be described as including a third plane 77 which includes ordered bit lines 91C, 92C, 93C,—and a fourth plane 78 which includes ordered bit lines 91D, 92D, 93D,—.

The like-numbered, even-ordered bit lines of planes 75, 76 of array 72, e.g., bit lines 91A, 91B, and of planes 77, 78 of array 74, e.g., bit lines 91C, 91D, are intercoupled at their like, corresponding ends in a nontransposed manner forming continuous circuits around the associated planes.

The like-numbered, odd-ordered bit lines of planes 75, 76 of array 72, e.g., bit lines 92A, 92B and of planes 77, 78 of array 74, e.g., bit lines 92C, 92D, are intercoupled at their like, corresponding ends in a nontransposed manner forming continuous circuits around the associated planes.

The like-numbered even-ordered bit lines of planes 76 and 77 of arrays 72 and 74, respectively, e.g., bit lines 91B and 91C, respectively, are intercoupled at their corresponding open, nonintercoupled ends in a nontransposed manner by associated intercoupling means 91E.

The like-numbered odd-ordered bit lines of planes 76 and 78 of array 72 and 74, respectively, e.g., bit lines 92B and 92D, respectively, are intercoupled at their corresponding open, nonintercoupled, ends in a transposed manner by associated intercoupling means 92E.

Thus, it can be seen by an inspection of FIG. 3 that the like-numbered, even-ordered bit lines of planes 75, 76, 77, 78, e.g., bit lines 91A, 91B, 91C, 91D are intercoupled by their associated intercoupling means, e.g., intercoupling means 91E, in a nontransposed manner weaving forth and back through the memory stack 70. Further, it can be seen that the like-numbered, oddrordered bit lines of planes 75, 76, 77, 78 are intercoupled by their associated intercoupling means, e.g., intercoupling means 92E, in a transposed manner whereby the electrical sense of the "nontransposed" bit line 92 segments 92A, 92B is opposite to the electrical sense of the "transposed" bit line 92 segments 92C, 92D. Thus, the external field coupled signals in adjacent bit lines in planes 75, 76 flow in like directions, i.e., in adjacent bit lines 91A, 91B, and 92A, 92B flow in like directions, while the external field coupled signals in adjacent bit lines in planes 77, 78 flow in opposite directions, i.e., in adjacent bit lines 91C, 91D and 92C, 92D flow in opposite directions, respectively.

Figure 4:
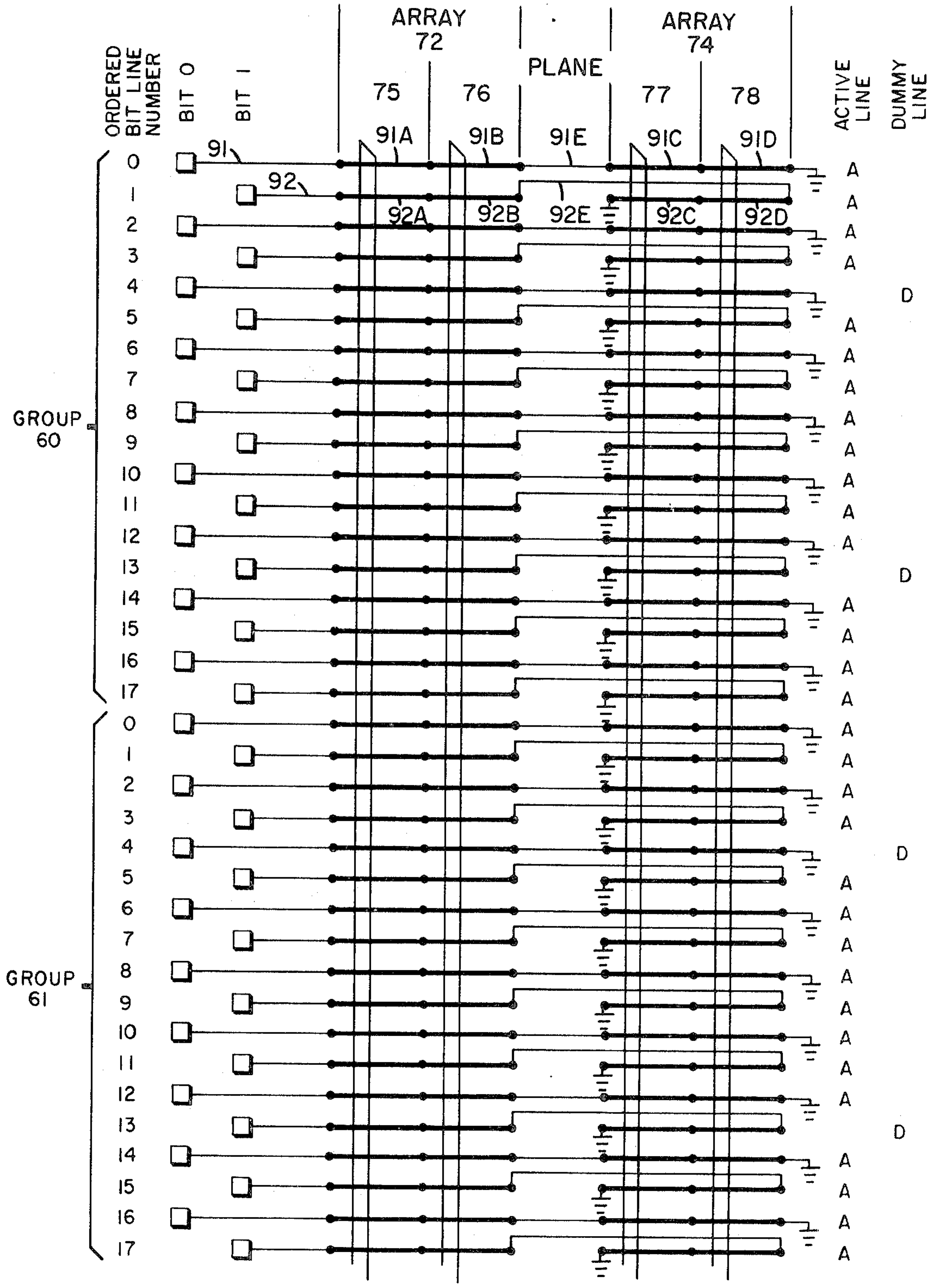
FIG. 4 is a schematic illustration of the electrical configuration of the transposition, interposition scheme of the present invention.

With particular reference to FIG. 4 there is presented a schematic illustration of the electrical configuration of the two-array, two planes per array configuration of the plated wire memory stack in which the present invention is incorporated. This schematic illustration of the transposed/interposed nature of the wiring configuration of the illustrated contiguous pairs of groups 60, 61 is representative of the wiring configuration of the other contiguous pairs of groups, such groups 62, 63 and 64, 65 and 66, 67 and 68, 69 being configured in a similar manner. Using the same reference numerals as in FIG. 3 for comparable elements the ordered bit lines 0–17 of group 60 and 0–17 of group 61 are aligned in parallel rows from top to bottom with alternate, even-numbered bit lines, e.g., ordered bit lines 0, 2, 4, 6, —,being coupled in a nontransposed manner as illustrated by the illustrated bit line segments 91A, 91B, 91C, 91D, 91E of bit line 91 while the other alternate odd-numbered bit lines, e.g., bit lines 1, 3, 5, 7, —, are intercoupled in a transposed manner as illustrated by the illustrated bit line segments 92A, 92B, 92C, 92D, 92E of bit line 92. It is to be noted, as is illustrated in FIG. 3, that the intra-array bit line segments of the two planes of the two arrays are intercoupled at their like, superposed ends in a nontransposed manner while the transposed/nontransposed interarray coupling of the bit line segments is effected by an interplane intercoupling means, i.e., 91E, 92E, 93E,—.

The illustrated circuit schematic is depicted as consisting of two arrays 72, 74 each of which includes two planes 75, 76 and 77, 78, respectively, all the bit lines of each plane being coupled by a single identified word line, e.g., all the bit line segments, e.g., 91A, 92A,—, of plane 75 of array 72 are coupled by word line 42. As an example of the above, nontransposed bit line 91 is formed by the intercoupling of intercoupled bit line segments 91A, 91B, and 91C, 91D by interarray 72, 74 nontransposed intercoupling means 91E while transposed bit line 92 is formed by the intercoupling of intercoupled bit line segments 92A, 92B and 92C, 92D by interarray 72, 74 transposed intercoupling means 92E.

This transposed/nontransposed intercoupling of the bit line segments of the alternate, odd/even ordered bit lines of groups 60, 61 causes parallel, adjacent bit line segments to be capacitively and inductively coupled to each other in an external-field coupled like-directional manner and in an external-field-coupled opposite-directional manner, respectively. This like-direction, opposite-direction wiring configuration of parallel adjacent bit lines produces a substantial reduction of crosstalk noise due to bit line generated noise fields. However, such arrangement requires that the bit line of each active line, dummy line combination must be both transposed or nontransposed to effect the desired noise cancellation at the associated differential amplifier such as at bit selectors 50–59 of FIG. 2.

To implement this desired arrangement, alternate bit lines of two contiguous groups of bit lines are grouped together to define a bit of the multibit word that is associated with the particular selected word line. That is, in the illustrated embodiment of FIG. 4 the even-numbered bit lines, e.g., bit lines 0, 2,—, 14, 16, of groups 60, 61 are grouped together to define bit 0 of the word while the odd-numbered bit lines, e.g., bit lines 1, 3,—, 15, 17, of groups 60, 61 are grouped together to define bit 1 of the word, the bit lines of the other contiguous pairs of groups of bit lines being configured in a like manner. Thus, the bit lines that define pairs of bits of a word are interposed with each other, alternate bit lines defining a particular like bit. Accordingly, in the illustrated embodiment the even-numbered, nontransposed bit lines of groups 60, 61 are coupled to bit selector 50 while the odd-numbered transposed bit lines of group 60, 61 are coupled to bit selector 51. This arrangement ensures that both bit lines of any active line, dummy line combination are both of a transposed or of a nontransposed wiring configuration. In FIG. 4 the active lines A and the dummy lines D are located within each group as noted; however, such arrangement is not to be construed as critical, but by way of example only.

What is claimed is:

1. In a plated wire memory stack comprising two arrays, each array including a plurality of parallel bit lines and a plurality of parallel word lines orthogonal to and inductively coupled to the bit lines, the bit lines of each array being arranged in groups of like numbers of contiguous bit lines, the method of reducing bit line to bit line coupled noise comprising:

coupling alternate bit lines of each group of the first array to alternate bit lines of an associated group of the second array in a nontransposed manner; and, coupling the other-alternate bit lines of each group of the first array to the other-alternate bit lines of the associated group of the second array in a transposed manner;

for directing the current in contiguous bit lines to flow in like directions in said first array and in opposite directions in said second array.

2. The method of claim 1 further including:

grouping the open ends of the alternate bit lines of two contiguous groups of bit lines of the first array for forming a first set of alternate bit lines including only the nontransposed-coupled alternate bit lines of the second array and defining a first bit of a plurality of multibit words;

grouping the open ends of the other-alternate bit lines of said two contiguous groups of bit lines of the first array for forming a second set of other-alternate bit lines including only the transposed-coupled other-alternate bit lines of the second array and defining a second bit of said multibit words.

3. The method of claim 2 wherein said alternate bit lines are the even-ordered bit lines of each group; and said other-alternate bit lines are the odd-ordered bit lines of each group.

4. In a plated wire memory stack comprising two arrays, each array including a plurality of parallel, coplanar bit lines and a plurality of parallel word lines orthogonal to and inductively enveloping the bit lines, the bit lines arranged in groups of like numbers of contiguous, ordered bit lines, the method of reducing bit line to bit line coupled noise comprising:

coupling each alternate-ordered bit line of each group of the first array to a separate like, alternate-ordered bit line of an associated group of the second array in a nontransposed manner; and, coupling each other-alternate-ordered bit line of each group of the first array to a separate like, other-alternate-ordered bit line of said associated group of the second array in a transposed manner;

for directing the current in contiguous bit lines to flow in like directions in said first array and in opposite directions in said second array;

grouping first ends of all of the alternate-ordered bit lines of two groups of bit lines of the first array for forming a first set of bit lines including all of the nontransposed alternate-ordered bit lines of the second array and defining the first bit of each of a plurality of multibit words;

grouping first ends of all of the other-alternate-ordered bit lines of said two groups of bit lines of the first array for forming a second set of bit lines including all of the transposed other-alternate-ordered bit lines of the second array and defining the second bit of each of said plurality of multibit words;

aligning the first and second bits of said multibit words along all of said word lines for forming as many multibit words along each of said word lines as said like numbers of contiguous bit lines in each of said groups of bit lines.

5. The method of claim 4 in which the alternate-ordered bit lines are the even-ordered bit lines and the other-alternate-ordered bit lines are the odd-ordered bit lines.

6. The method of claim 4 further including:

coupling the first set of bit lines to a first line selector, and coupling the second set of bit lines to a second line selector.

7. In a plated wire memory stack comprising two arrays, each array including two planes, each plane including a plurality of parallel bit lines and a plurality of parallel word lines orthogonal to and inductively coupled to the bit lines, the bit lines arranged in groups of like numbers of contiguous, ordered bit lines, each group including a plurality of magnetizable material plated active lines and one half of the dummy lines being odd-ordered bit lines and the other half of the active lines and the other half of the dummy lines being even-ordered bit lines, the method of reducing bit line to bit line coupled noise comprising:

intercoupling superposed, like-ordered bit lines of the first and second planes of the first array in a nontransposed manner;

intercoupling superposed, like-ordered bit lines of the third and fourth planes of the second array in a nontransposed manner;

intercoupling alternate like-ordered nonintercoupled ends of the bit lines of the second and third planes in a nontransposed manner;

intercoupling the other-alternate like-ordered nonintercoupled ends of the bit lines of the second and fourth planes in a transposed manner;

grouping the nonintercoupled ends of the bit lines of the first plane in a first set including only the intercoupled nontransposed bit lines of the first and second arrays, and grouping the nonintercoupled ends of the bit lines of the first plane in a second set including only the intercoupled transposed bit lines of the first and second arrays;

coupling the first set of bit lines to a first active line, dummy line selector, and coupling the second set of bit lines to a second active line, dummy line selector.

* * * * *

UNITED STATES PATENT OFFICE
CERTIFICATE OF CORRECTION

Patent No. 3,643,239 Dated February 15, 1972

Inventor(s) Thomas W. Mack, et al

It is certified that error appears in the above-identified patent and that said Letters Patent are hereby corrected as shown below:

Column 7, line 19, after "lines and" should read -- a plurality of dummy lines, one half of the active lines and --. Throughout the entire printed patent "plated wire" should read -- plated-wire --.

Signed and sealed this 7th day of November 1972.

(SEAL)
Attest:

EDWARD M.FLETCHER,JR.
Attesting Officer

ROBERT GOTTSCHALK
Commissioner of Patents